(12) United States Patent
Rolland

(10) Patent No.: US 9,243,717 B2
(45) Date of Patent: Jan. 26, 2016

(54) GATE VALVE, METHOD FOR RETURNED DRILLING MUD PRESSURE CONTROL AND/OR WELL KILLING, AND USES OF A GATE VALVE

(75) Inventor: Nils Lennart Rolland, Nyborg (NO)

(73) Assignee: STATOIL PETROLUEM AS, Stavanger (NO)

( * ) Notice: Subject to any disclaimer, the term of this patent is extended or adjusted under 35 U.S.C. 154(b) by 0 days.

(21) Appl. No.: 13/701,122

(22) PCT Filed: Jun. 3, 2011

(86) PCT No.: PCT/EP2011/059202
§ 371 (c)(1),
(2), (4) Date: Dec. 18, 2012

(87) PCT Pub. No.: WO2011/151445
PCT Pub. Date: Dec. 8, 2011

(65) Prior Publication Data
US 2013/0087733 A1    Apr. 11, 2013

(30) Foreign Application Priority Data

Jun. 3, 2010   (NO) .................................. 20100799

(51) Int. Cl.
*F16K 3/00* (2006.01)
*E21B 21/10* (2006.01)
*F16K 3/02* (2006.01)

(52) U.S. Cl.
CPC ................. *F16K 3/00* (2013.01); *E21B 21/106* (2013.01); *F16K 3/0209* (2013.01)

(58) Field of Classification Search
CPC ....... F16K 3/32; F16K 3/0209; F16K 3/0245; F16K 3/30; E21B 21/106

USPC .................................. 251/326–329, 205–206
See application file for complete search history.

(56) References Cited

U.S. PATENT DOCUMENTS

| | | | |
|---|---|---|---|
| 1,953,828 A * | 4/1934 | Johnson ........................ | 138/94.3 |
| 1,986,600 A | 1/1935 | Pigott | |
| 2,664,267 A | 12/1953 | Ray | |
| 4,062,516 A * | 12/1977 | Grove ............................ | 251/174 |
| 4,354,663 A | 10/1982 | Vanderburg et al. | |
| 4,664,139 A * | 5/1987 | Pfeiffer ........................ | 137/240 |
| 4,711,262 A | 12/1987 | Wafer et al. | |
| 5,205,537 A * | 4/1993 | Pfeiffer ........................ | 251/205 |
| 5,368,276 A * | 11/1994 | Pfeiffer ........................ | 251/205 |
| 5,803,431 A | 9/1998 | Hoang et al. | |
| 6,536,473 B2 | 3/2003 | Bohaychuk | |
| 7,004,445 B2 * | 2/2006 | Lymberopoulos ............. | 251/14 |
| 2003/0136927 A1 | 7/2003 | Baugh | |
| 2011/0266302 A1 | 11/2011 | Masse | |

FOREIGN PATENT DOCUMENTS

FR         954.154         12/1949

* cited by examiner

*Primary Examiner* — Marina Tietjen
(74) *Attorney, Agent, or Firm* — Birch, Stewart, Kolasch & Birch, LLP

(57) ABSTRACT

A gate valve is provided for returned drilling mud pressure control and/or well killing. The gate valve includes a flow passage; and a gate member movable for intersecting the flow passage. The gate member includes a gate port which extends from one face to an opposite face of the gate member and is alignable with the flow passage for allowing material in the flow passage to pass through the gate member, and a groove or recess is provided in an inner wall of the gate port, the groove or recess extending from the one face to the opposite face of the gate member. A method is provided for returned drilling mud pressure control and/or well killing, and uses of a gate valve.

15 Claims, 3 Drawing Sheets

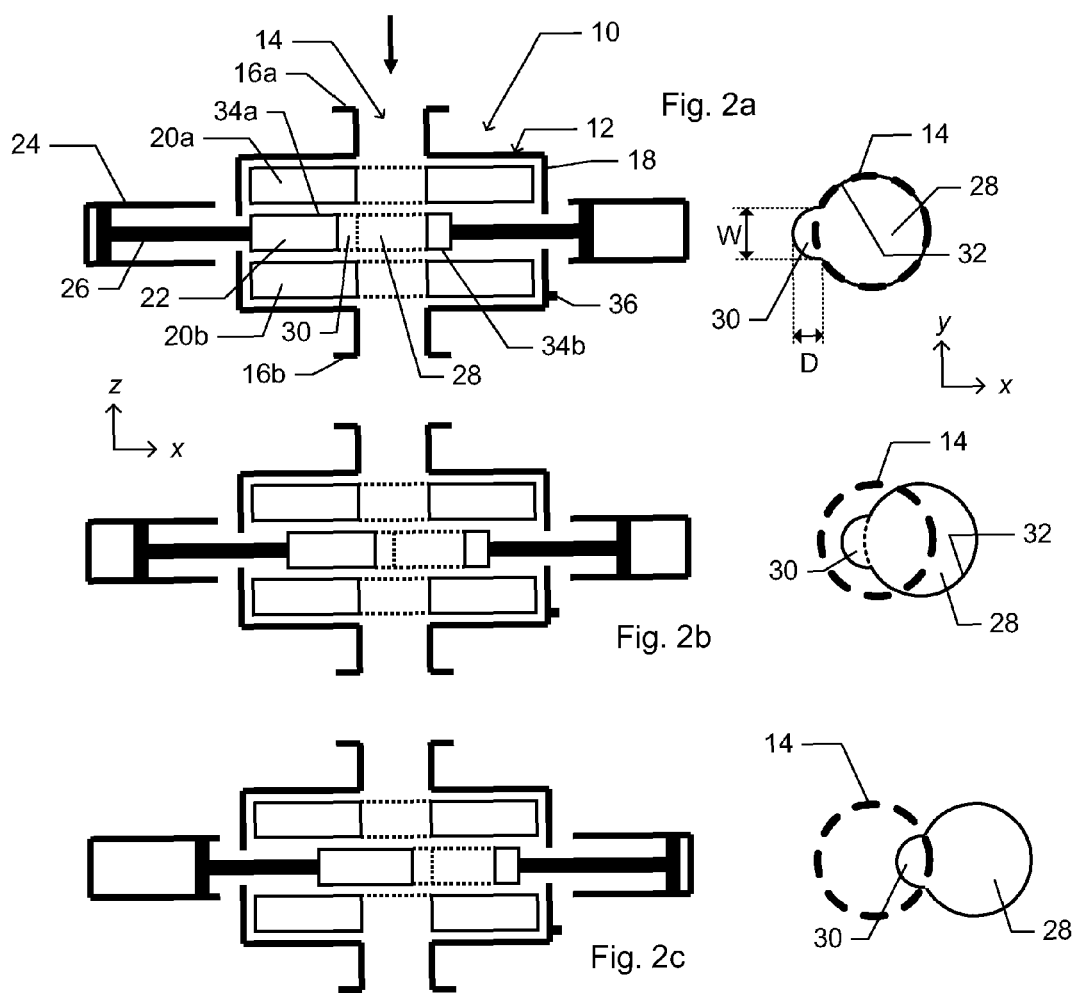

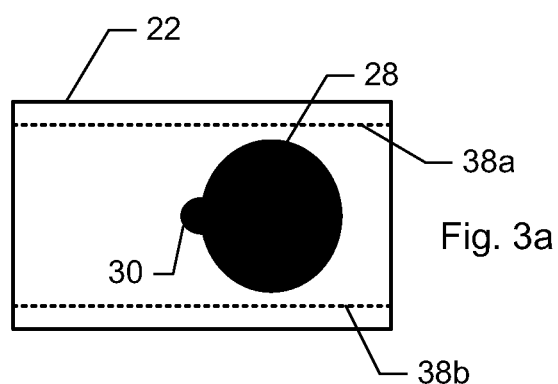
Fig. 3a
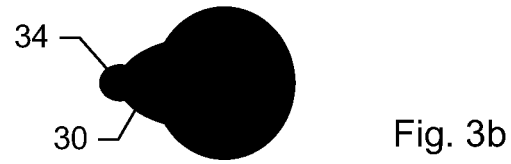
Fig. 3b
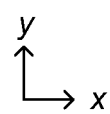
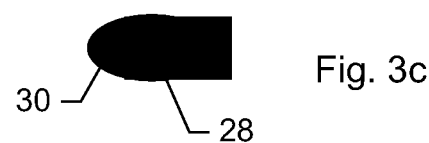
Fig. 3c

GATE VALVE, METHOD FOR RETURNED DRILLING MUD PRESSURE CONTROL AND/OR WELL KILLING, AND USES OF A GATE VALVE The present invention relates to a gate valve, a method for returned drilling mud pressure control and/or well killing, and uses of a gate valve.

An example of a gate valve is disclosed in U.S. Pat. No. 2,664,267 (Ray) relating to a hydraulically balanced gate valve structure, wherein a gate member is slidable to open and closed position, so as to establish or interrupt communication between an inlet passage and an outlet passage. The gate has a through opening adapted to align with the inlet and outlet passage when the valve is in the open position. The gate is further provided with a through oblique aperture or opening separate from the through opening, which through oblique aperture or opening is registerable with the inlet passage and a recess outside the outlet passage when the gate is in the closed position.

Another example of a gate valve is disclosed in U.S. Pat. No. 4,711,262 (Wafer et al.), which gate valve comprises a pressure relief port. In one embodiment, the pressure relief port is located near the lower end of the inlet face of the valve's gate, and extends between said face and the gate's flow passage.

Further, US 2003/0136927 A1 (Baugh) discloses a choke or kill line connector for a subsea blowout preventer stack. The connector comprises a slide member which is provided with a flow path at an angle.

Turning to returned drilling mud pressure control and/or well killing, in particular in relation to an oil well, a drilling choke may be used for such applications. Such a choke typically has a right-angled flow path, and a rather complicated construction. An example of a choke with an right-angled flow path is disclosed in the U.S. Pat. No. 6,536,473 (Bohaychuk).

Further, the types of chokes used in MPD (managed pressure drilling) today are standard or spin-offs from the drilling chokes and oil & gas production chokes. The normal pressure range is from 345 bar and as high as 1380 bar. However, MPD is done presently at about 50 bar back pressure and future plans are maybe as high as 150 bar. The flow port in the choke will then be too small for drill cuttings and trash to pass.

Also, MPD requires even and continuous flow that can fluctuate quickly to hold required bottom borehole pressure within a small window (±2.5 bar). However, the traditional choke design is not suitable for this service.

It is an object of the present invention to at least partly overcome drawbacks with traditional chokes, and to provide an improved or different device and method for returned drilling mud pressure control and/or well killing.

It is another object of the present invention to provide an improved or different gate valve.

These, and other objects that will be apparent from the following description, are achieved by the present invention as defined in the appended independent claims. Embodiments are set forth in the appended dependent claims.

According to an aspect of the present invention, there is provided a gate valve, in particular for returned drilling mud pressure control and/or well killing, the gate valve comprising: a flow passage, and a gate member movable for intersecting the flow passage, wherein the gate member includes a gate port which extends from one face to an opposite face of the gate member and is alignable with the flow passage for allowing material in the flow passage to pass through the gate member, and wherein a groove or recess is provided in an inner wall of the gate port, the groove or recess extending from the one face to the opposite face of the gate member.

The groove or recess may have a cup-shaped or lune-shaped or substantially circular cross section.

The gate port except the groove or recess may conform with, e.g. have substantially the same diameter as, the flow passage.

The gate valve may further comprise two seats, wherein the gate member is provided or balanced between the two seats.

The two seats may be fully skirted.

The gate valve may further comprise a resilient layer provided between each seat and a housing of the gate valve.

The flow passage may be substantially straight.

The groove or recess of the present gate valve enables low flow with an opening as much circular as possible, to allow cuttings to pass and to allow flow regulation accurately. The gate port with the groove or recess may be such all flow regulation is mainly through the groove or recess, and full opening port is only used for flushing or when flow restriction is not required (normal drilling). Further, the gate valve can be opened/closed rather quickly, enabling e.g. trash or drill cuttings to pass with a low variation in downstream pressure.

According to another aspect of the present invention, there is provided a method for returned drilling mud pressure control and/or well killing, wherein a gate valve of the type described above is connected to a pipe or the like associated with a well or bore hole, the method comprising the step of: moving the gate member relative to the flow passage for regulating any flow in the flow passage. Moving the gate member relative to the flow passage may comprises: moving the gate member to a position wherein the groove or recess is aligned with the flow passage, whereby material in the flow passage may pass the gate member via the groove or recess. This aspect of the invention may exhibit the same or similar features and technical effects as the previously described aspect.

Other aspects of the present invention relate to the use of a gate valve of the type described above as a choke in managed pressure drilling, and to the use of a gate valve of the type described above as a drilling choke for returned drilling mud pressure control and/or well killing. These aspects of the invention may exhibit the same or similar features and technical effects as the previously described aspects.

The present gate valve could also be defined as a through conduit gate valve, comprising a flow passage and a gate, wherein the gate is provided with an extended gate port, and wherein the valve is designed such that in a regulatory position of the gate, the resulting opening through the gate is substantially circular.

These and other aspects of the present invention will now be described in more detail, with reference to the appended drawings showing currently preferred embodiments of the invention.

FIGS. 2a-2c illustrate an exemplary operation of the gate valve of FIG. 1.

FIGS. 3a-3c illustrate examples of extended gate ports according to the present invention.

FIG. 1 shows a gate valve 10 according to an embodiment of the present invention.

Figure 1:
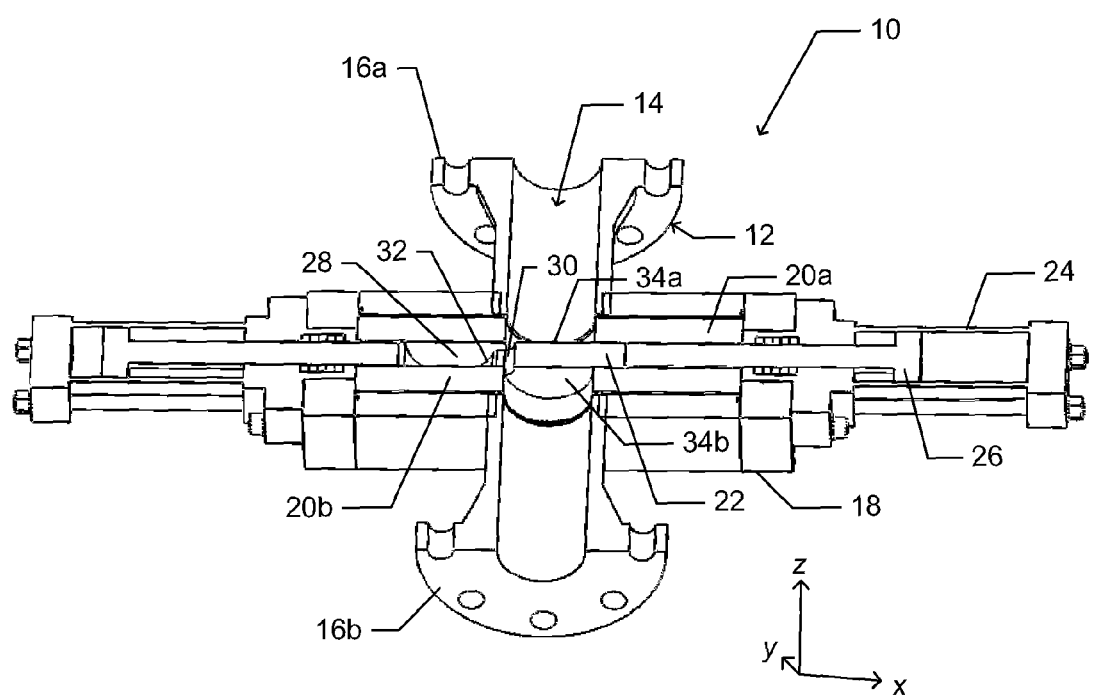
FIG. 1 is a sectional view in perspective of a gate valve according to an embodiment of the present invention.

The gate valve 10 comprises a gate body or housing 12. The gate body 12 defines or comprises a flow or fluid passage 14 formed as a straight bore with a substantially circular cross section. At one end of the passage 14, the gate body 12 is provided with a first or upper flange 16a for connection to e.g. a pipe (not shown). A second or lower flange 16b is likewise provided at the other end of the passage 14, for connection to another member, e.g. a pipe (not shown).

A valve bonnet 18 of the gate body 12 further accommodates a first or upstream seat 20a, and a second or downstream seat 20b. Between the first and second seats 20a and 20b in the bonnet 18, there is provided a gate member 22. The gate member 22 is arranged to move in directions substantially perpendicular to the main (flow) direction of the passage 14, e.g. to the left and right in FIG. 1. The gate member 22 may be hydraulically actuated by means of at least one hydraulic cylinder 24 and valve stem 26. The gate member 22 may also be actuated by other suitable means, e.g. electrically, and should not be limited only to the above examples.

The gate member 22 includes a fixed gate port 28. The gate port 28 is an opening that extends through the gate member 22 from one face 34a to the other 34b. The gate port 28 has an overall circular cross section, with the same diameter as the passage 14. Hence, as the gate member 22 is appropriately positioned, the gate port 28 may be completely aligned with the passage 14, so that material in the passage 14 freely can pass the gate member 22. A gate valve, wherein the gate has a port or opening which may be aligned with the flow passage, can generally be referred to as a through conduit (adjustable) gate valve.

In the present gate valve 10, a recess or groove 30 is further provided in the inner wall 32 of the gate port 28. The gate port 28 with the recess or groove 30 may be referred to as an extended gate port. The recess or groove 30 extends in a substantially straight path from the face 34a to the face 34b. The cross section of the recess or groove 30 in the x-y plane may be cup-shaped (e.g. semicircular) or lune-shaped or substantially circular. The cross section of the recess or groove 30 may be the same throughout the recess or groove 30. The width W of the recess or groove 30 may for instance be about 12.5 millimeters or larger, and the depth D of the recess or groove 30 may for instance be about 6.25 millimeters or more (see FIG. 2a). When the rest of the gate port 28 is substantially removed from the passage 14, communication in the passage 14 through the gate member 22 may still be allowed via the recess or groove 30, as it will be explained further in the following with reference to FIGS. 2a-2c.

FIGS. 2a-2c illustrate three states of the present gate port 10 (namely different positions of the gate member 22), though further states may be possible. To the left in FIGS. 2a-2c are schematic side views, while corresponding schematic top views are shown to the right. The general flow direction through the passage 14 is indicated by the bolded arrow.

FIG. 2a illustrate a fully open position, wherein the gate member 22 is positioned so that the main circular section of the gate port 28 (i.e. the gate port 28 except the groove or recess 30) is completely aligned with the flow passage 14.

FIG. 2b illustrate a first regulating position, wherein the gate port 28 is only partly aligned with the flow passage 14, so that the flow through the passage 14 past the gate member 22 is more limited compared to the fully open position of FIG. 2a.

FIG. 2c illustrates a second regulating or "closed" position, wherein the main circular section of the gate port 28 is substantially outside the passage 14, but wherein the groove or recess 30 still is aligned with the passage 14, allowing material such as cuttings and trash to pass the gate member 22. The portion of the gate port 28 (including the groove or recess 30) that is "exposed" to the flow passage 14 in this position is rather circular (see FIG. 2c to the right), to allow cuttings to pass and to allow accurate flow regulation.

The gate member 22 could also be moved further to completely block the flow passage 14.

FIGS. 3a-3c illustrate alternative shapes of the extended gate port. In FIG. 3a, the gate member 22 is provided with a gate port shaped like the one shown in FIGS. 1 and 2a-2c. In FIG. 3b, another groove or recess 34 is provided in the "bottom" of the groove or recess 30, as illustrated. In FIG. 3c, the gate port 28 except the groove or recess 30 has a smaller area or extension in the x-y plane than the flow passage.

The present gate vale 10 may for instance be used as a choke in managed pressure drilling, or as a drilling choke for returned drilling mud pressure control and/or well killing. However, the present gate valve may be used in other applications as well. Further, the present gate valve may be used subsea, top side, or on land. For returned drilling mud pressure control and/or well killing, the present gate valve may be connected to a pipe or similar (not shown) of a well. The well is for instance an oil and/or gas well. The flow of material in the passage 14 of the valve 10 is then regulated by moving the gate member 22 in the flow passage 14 substantially perpendicularly to the flow passage 14, as indicated in FIGS. 2a-2c.

Features of the present gate valve may (further) include:
Balanced (stem) gate in choke valve
Straight bore and full opening choke valve
Gate full bore with extended opening to allow trash to pass at minimum flow. Gate port can have any form and shape applicable to regulate flow.
Seat fully skirted (i.e. the gate member is always in contact with and supported by the seats regardless of the position of the gate member) to trap content in gate port when valve is in closed position.
Resilient layer on seats to valve body to maintain pretension to the gate for the working pressure range of the valve.
Changeable wear spool inserted in outlet spool and downstream seat to prevent pitting.
Inlet and outlet spool can be removed and replaced to any end connection and to allow insertion change out of wear spool.
Groove (reference signs 38a and 38b in FIG. 3a) on each side of the gate to allow body filler to escape when valve is operated.
Pre-tensioned seats to choke valve body to maintain contact to the gate.
Diamond coating of downstream gate and seat face.
The bonnet of the gate valve may be provided with a body filler port (reference sign 36 in FIG. 2a).

The person skilled in the art will realize that the present invention by no means is limited to the embodiments described above. On the contrary, many modifications and variations are possible within the scope of the appended claims.

The invention claimed is:

1. A gate valve for returned drilling mud pressure control and/or well killing, the gate valve comprising:
a flow passage;
a gate member movable for intersecting the flow passage;
two fully skirted seats; and
a valve bonnet arranged to accommodate said two fully skirted seats and said gate member such that the gate member is contained within the valve bonnet regardless of the position of the gate member,
wherein the gate member includes a gate port which extends from one face to an opposite face of the gate member and is alignable with the flow passage for allowing material in the flow passage to pass through the gate member, and wherein a groove or recess is provided in an inner wall of the gate port, the groove or recess extending from the one face to the opposite face of the gate member, wherein the gate valve includes a regulating position in which a main circular section of the gate port is outside the flow passage, and the groove or recess is aligned with the passage to allow material to pass the gate member, and wherein the two fully skirted seats are configured such that the gate member is always in contact with and supported by the two fully skirted seats at both sides of the flow passage regardless of the position of the gate member.

2. The gate valve according to claim 1, wherein the groove or recess has a cup-shaped or lune-shaped or substantially circular cross section.

3. The gate valve according to claim 2, wherein the gate port except the groove or recess conforms with the flow passage.

4. The gate valve according to claim 2, wherein the flow passage has a diameter that is the same as a diameter of the gate port except the groove or recess.

5. The gate valve according to claim 2, wherein the flow passage is substantially straight.

6. The gate valve according to claim 1, wherein the gate port except the groove or recess conforms the flow passage.

7. The gate valve according to claim 6, wherein the flow passage is substantially straight.

8. The gate valve according to claim 1, wherein the flow passage is substantially straight.

9. A method for returned drilling mud pressure control and/or well killing, wherein a gate valve according to claim 1 is connected to a pipe associated with a well or borehole, the method comprising the step of:

moving the gate member relative to the flow passage for regulating any flow in the flow passage.

10. The method according to claim 9, wherein moving the gate member relative to the flow passage comprises:

moving the gate member to a position wherein the groove or recess is aligned with the flow passage, whereby material in the flow passage may pass the gate member via the groove or recess.

11. A choke for managed pressure drilling, the choke comprising a gate valve according to claim 1.

12. The gate valve according to claim 1, wherein the flow passage has a diameter that is the same as a diameter of the gate port except the groove or recess.

13. A drilling choke for returned drilling mud pressure control and/or well killing, the drilling choke comprising a gate valve according to claim 1.

14. A through conduit gate valve, comprising:
a flow passage;
a gate;
two fully skirted seats; and
a valve bonnet arranged to accommodate said two fully skirted seats and said gate member such that the gate member is contained within the valve bonnet regardless of the position of the gate member, wherein the gate is provided with an extended gate port, and wherein the valve is designed such that in a regulating position of the gate, the resulting opening through the gate is substantially circular, the extended gate port including a main port and a groove or recess formed on the inner wall of the main port, wherein the through conduit gate valve includes the regulating position in which a main circular section of the extended gate port is outside the flow passage, and the groove or recess is aligned with the passage to allow material to pass the gate member, and wherein the two fully skirted seats are configured such that the gate member is always in contact with and supported by the two fully skirted seats at both sides of the flow passage regardless of the position of the gate.

15. A drilling mud pressure control gate valve comprising:
a flow passage;
a gate member movable for intersecting the flow passage;
two fully skirted seats; and
a valve bonnet arranged to accommodate said two fully skirted seats and said gate member such that the gate member is contained within the valve bonnet regardless of the position of the gate member, wherein the gate member includes a gate port which extends from one face to an opposite face of the gate member and is alignable with the flow passage for allowing material in the flow passage to pass through the gate member, wherein a groove or recess is provided in an inner wall of the gate port, the groove or recess extending from the one face to the opposite face of the gate member, wherein the drilling mud pressure control gate valve has a regulating position in which a main circular section of the gate port is outside the passage, and the groove or recess is aligned with the passage to allow material to pass the gate member, and wherein the two fully skirted seats are configured such that the gate member is always in contact with and supported by the two fully skirted seats at both sides of the flow passage regardless of the position of the gate member.

* * * * *